Figure 1:
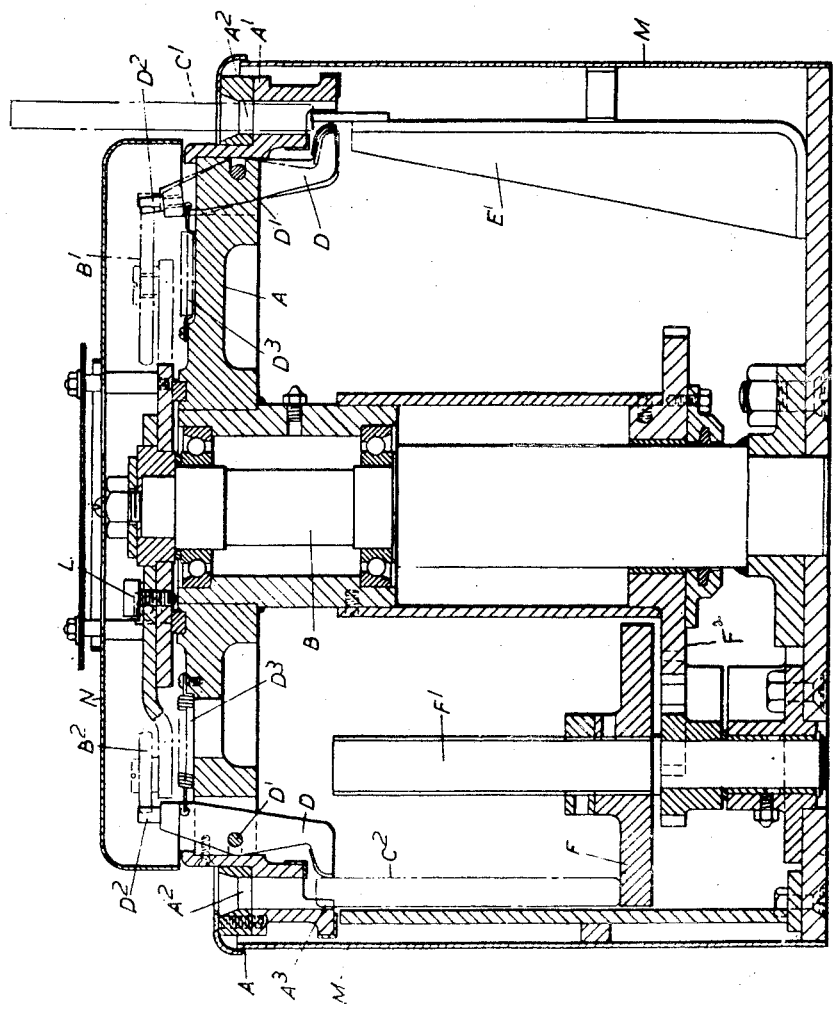

July 22, 1952  L. C. COLLYER  2,604,576
HANDLING OF PINS

Filed Aug. 19, 1949  2 SHEETS—SHEET 1

Inventor
Leonard Charles Collyer
By
Attorney

Patented July 22, 1952

2,604,576

UNITED STATES PATENT OFFICE 2,604,576

HANDLING OF PINS

Leonard Charles Collyer, Wollongong, New South Wales, Australia, assignor to The Ohio Crankshaft Company, Cleveland, Ohio, a corporation of Ohio Application August 19, 1949, Serial No. 111,281 In Great Britain September 7, 1948

12 Claims. (Cl. 219—47)

This invention relates to machines for the handling of pins, such for example as the pins or bars used for making bolts or headed pins. One application for which the invention is particularly, though not exclusively, suitable is to machines for feeding pins to a high frequency electric induction heater by which a portion of their length including one end is heated to enable them to be forged to form a head. An object of the invention is to provide a machine which will satisfactorily handle such pins of varying lengths within given limits. In some cases it may be desirable to heat nearly the whole length of the pin and in other cases only to heat a small fraction of it, but it will always be required to leave one end cold.

Great difficulty has previously been experienced in automatically handling the pins because of their rough condition. The pins are cropped from lengths of bar and their ends may be out of square, distorted, tapered, rounded or jagged. The pins are often bent, rusty, dirty or greasy and they are liable to vary from their nominal length.

One prior arrangement consisted essentially of horizontal heating coils into which the pins were partly entered on skids, but magnetic scale from the pins was liable to work its way under the skids and force them up, causing jamming of the pins and short-circuiting of the coil.

Other known devices have been tried which grip the pins rigidly at one end and insert them horizontally into heating coils, but these gave trouble when there was only a short length of pin in the grip, as the pins projected at varying angles and tended to droop because of their overhung weight.

The present invention contemplates and has for its principal object a machine for handling pins, which overcomes all of the above difficulties referred to and others, includes a magazine for receiving the pins with their axes vertical and their lower ends supported on an upper stop, means for disengaging each pin from the upper stop to allow it to fall until the majority of its length is clear of the magazine, a lower stop to limit its fall and support it in this position, a clamp situated adjacent the lower part of each pin in its initial position and adjacent its upper part when in its fallen position, and arranged to grip the upper part of the pin when in the latter position, and means for removing the lower stop relatively from the pin to allow the pin to hang freely from the clamp. Such a machine may be applied for various purposes, but in one particular application it includes also induction heating means for heating the pin as it hangs from its clamp.

In one arrangement the magazine has a feeding movement imparted to it, for example rotation about a vertical axis, and is provided with a clamp for each pin moving with the magazine, and the lower stop is also arranged to move, at the point where the pin rests on it, substantially in the same direction and at the same speed as the magazine and clamps. The upper stop, constituting a false bottom to the magazine, may remain stationary and may terminate at the point where the pins are to fall so that each pin falls from the magazine on reaching the end of the upper stop. The clamps may be operated in succession by one or more stationary cams common to them.

Figure 2:
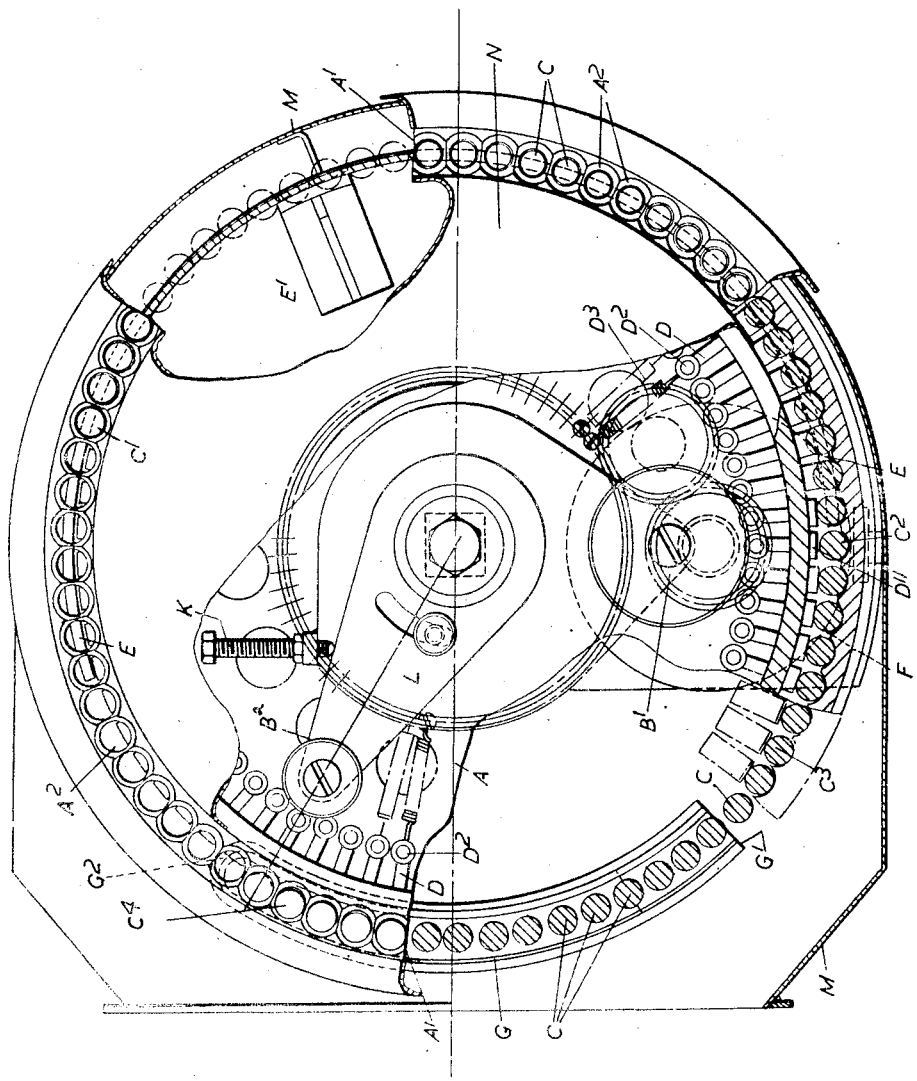

The invention may be carried into practice in various ways, but one specific embodiment will now be described by way of example with reference to the accompanying drawings, in which:

Figure 1 is a sectional elevation of a machine for handling pins for induction heating, and Figure 2 is a plan of the apparatus of Figure 1.

In this embodiment a disc A is mounted to rotate on a fixed vertical shaft B, and carries at its periphery a ring $A^1$ having in it a series of equally spaced vertical holes $A^2$ of circular section and large enough diameter to receive any of the roughly finished pins C with ease. These holes, whose centres are located on a common pitch circle, are roughly three diameters in depth and are well countersunk at the top to facilitate entry of the pins C. They are spaced so that there are small gaps between the pins.

At the bottom of each hole $A^2$ is the head of a clamp D pivoted at $D^1$ to the disc $A^1$ and spring-loaded so that it tends to close on to and grip a pin C that is in the hole. The clamps D are opened consecutively by a pair of cams $B^1$ and $B^2$ fixed to the vertical shaft B and comprising stationary arms with rollers at their ends which bear upon bosses $D^2$ on the upper ends of the clamps D opposite their heads, and thus rock them on their pivots $D^1$ against the action of the springs $D^3$. One cam $B^1$ serves to open the clamps at a point where pins C are first introduced into them and the other cam $B^2$ serves to open the clamps at the point where they are required to release the pins C.

An upper stop or skid track E in the form of a rail of rectangular section bent to form an arc of a circle in plan is supported by a bracket $E^1$ and arranged coaxial to and below the ring $A^1$, its mean radius being equal to that of the pitch circle of the holes. The arrangement is such that pins passing through the holes when the clamps are open can rest with their upper parts supported in the holes and with their lower ends resting on the skid track E, and sliding on it as the ring $A^1$ rotates, as shown at $C^1$ in Figure 1.

A lower stop F in the form of a circular horizontal platform mounted on a second vertical shaft $F^1$ is rotated by a train of gears $F^2$ which also drives the main disc A and ring $A^1$, and the gear ratio is such that the tangential velocity of the periphery of the platform F is the same as the tangential velocity of the holes $A^2$ in the ring. The platform is also located so that its peripheral portion rotates directly underneath the holes in the ring, and also underneath the delivery end of the skid track E. The depth of the platform F below the ring $A^1$ is such that any pin which will be in use can stand with its lower end on the platform and with its upper end just within the grasp of the clamp associated with the hole immediately above the platform edge. For this purpose the height of the platform is made adjustable to suit different sizes of pin. Thus as a pin sliding along the skid track reaches its end it drops down until its lower end rests upon the moving platform as at $C^2$, its upper end being supported by the open clamp D and constrained thereby to move at the same tangential speed as its lower end.

Almost immediately after a pin has fallen the corresponding clamp clears the end of the cam $B^1$ and the spring is thereby permitted to close the clamp to grip the pin. Thus before the pin in question can move off the rotating platform F, its clamp will have closed on it as at $D^{11}$ in Figure 2 to hold it vertically from its upper end. The head of the clamp cooperates with a concave recess $A^3$ on an extension of the surface of the hole, and is rounded so as to grip the pin as between finger and thumb so that it will hang freely and vertically under its own weight. Thus the pins are carried forward in succession until they come clear of the supporting platform F, at $C^3$ in Figure 2, and remain freely suspended from their clamps.

The pins are carried thus suspended through the field of a heating coil or inductor, comprising a coil G connected to a source of high frequency electricity in the known manner. The inductor is of the "skate" or parallel-sided type, consisting of a helical coil with horizontal turns which is flattened and then curved to conform to the arcuate track of the suspended pins, so that one wall of the inductor is close to each side of that path. The entry end $G^1$ of the coil is bent downwards so that the joint loops below the lower ends of the entering pins, so that the sectional plan of the inductor as seen in Figure 2 surrounding the path of the pins is like an elongated U bent to an arc of a circle conforming to that path. The discharge cam $B^2$ is arranged to engage the clamps D so that the pins are released at a point $C^4$ before they reach the base of the U, and fall clear of the inductor, which is open underneath, into a chute or conveyor which carries them to the forging press. The discharge cam $B^2$ is rotatable about the axis of the ring $A^1$ so that the point of release $C^4$ of the pins can be varied. A stop K and locking means L are provided for this purpose. In addition the inductor G can be adjusted in level so as to suit both the length of the pins and the amount of each pin to be heated. Stationary walls M and a stationary cover N partially enclose the machine.

In operation, the machine is driven by an electric motor through a variable speed gear box and reduction drive. Pins C are inserted in the holes $A^2$, either automatically by a charger, or by hand five or six at a time, at a point $C^1$ over the skid track E, and fall through the holes until their lower ends are resting on the skid track.

The movement of the magazine or ring $A^1$ carries them round until each in succession reaches the end of the skid track or upper stop at which point $C^2$ each pin falls until it rests upon the lower stop F. The linear velocity of the latter is equal to that of the magazine and hence the pin remains vertical as its movement continues. After a very slight movement the associated clamp clears the fixed cam $B^1$ as at $D^{11}$ and closes to grip the upper end of the pin. As the movement continues the path of the pin held by the clamp diverges from the periphery of the lower stop and accordingly at the point $C^3$ the pin is suspended solely by the clamp from which it hangs freely.

Suspended in this way it is carried into the field of the inductor G and passes along it whilst being rapidly heated. After the pin has been heated to the required degree the associated clamp reaches the beginning of the cam $B^2$ which releases it so as to drop the pin at $C^4$ into the chute or conveyor leading to the forging press. In any case the pin is released before it reaches the far end $G^2$ of the inductor.

It will be appreciated that the construction described provides a simple and reliable method of heating pins of the type referred to. Thus the pins are accurately located so as to remain in the centre of the heating coil, the pins do not touch one another so that there is no fear of their welding together when heated, and any scale and dirt are free to fall out of the inductor and cannot accumulate and interfere with operation. The pins where they enter the inductor are held solely by their upper ends and no portion of the means for supporting the pins has to protrude into the inductor where it would be subjected to high temperature, would involve an increase in the size of the coil and would tend to accumulate magnetic scale, possibly resulting in distortion and penetration of the coil lining and short-circuiting of the coil. The process is continuous and since there are at all times a number of pins in the coil and fresh pins are entering at the same rate as heated pins are leaving it, magnetic conditions in the coil do not vary appreciably and hence the load on the electrical supply unit fluctuates but little. The discharge from the heater is instantaneous, heated pins dropping without delay to the forging press. Finally the machine is easily loaded and incorporates a magazine of pins so that it is not necessary to be loading it continuously and one operator can easily tend several machines, whilst the feeding movement of one pin does not depend upon a following pin and hence the failure of the supply of pins, or the end of a run, does not involve difficulty or allow a previous pin to remain in the coil until it melts, thus doing considerable damage.

What I claim as my invention and desire to secure by Letters Patent is:

1. A machine for handling pins, including a magazine for receiving the pins with their axes vertical, an upper stop arranged to support the lower ends of the pins in the magazine, means for moving each pin relative to said upper stop to allow it to fall, a lower stop serving to limit the fall of each pin and support it in a fallen position with the majority of its length clear of the magazine, clamps each situated adjacent and adapted to grip the upper part of a pin in its fallen position and means for removing the lower stop relatively from each pin to allow the pin to hang freely from its associated clamp.

2. A machine as claimed in claim 1 including releasing means adapted to open each clamp so as to release each pin after a predetermined period.

3. A machine for handling pins including a magazine for receiving the pins with their axes vertical, a stationary upper stop arranged to support the lower ends of the pins in the magazine and having an end, means for imparting a feeding movement to the magazine so as to disengage the pins successively from the upper stop by carrying them past its end, so that they fall, a lower stop serving to limit the fall of each pin and support it in a fallen position with the majority of its length clear of the magazine, clamps each situated adjacent and adapted to grip the upper part of a pin in its fallen position and means for removing the lower stop relatively from each pin to allow the pin to hang freely from its associated clamp.

4. A machine for handling pins including a magazine for receiving the pins with their axes vertical, means for imparting a feeding movement to the magazine, an upper stop arranged to support the lower ends of the pins in the magazine, means for moving each pin relatively to and beyond the upper stop to allow it to fall, a lower stop serving to limit the fall of each pin, and support it in a fallen position with a majority of its length clear of the magazine, means serving to move the lower stop so that that part of it which supports a pin moves substantially at the same speed and in the same direction as that part of the magazine which supports the upper part of the said pin, clamps mounted to move with the magazine and each situated adjacent and adapted to grip the upper part of a pin in its fallen position and means causing the path of the lower stop to diverge from the path of each pin when gripped in its associated clamp, so that each pin in turn is left hanging from its associated clamp.

5. A machine as claimed in claim 4 including releasing means adapted to open each clamp so as to release each pin after a predetermined period.

6. A machine for handling pins including an annular magazine mounted with its axis vertical for receiving the pins with their axes vertical, a stationary upper stop constituting a false bottom to the magazine to support the lower ends of the pins in the magazine and having an end, means for imparting to the magazine a feeding movement of rotation about its axis, so as to disengage the pins successively from their upper stop by carrying them past its end so that they fall, a lower stop serving to limit the fall of each pin and support it in a fallen position with the majority of its length clear of the magazine, clamps each situated adjacent and adapted to grip the upper part of a pin in its fallen position and means for removing the lower stop relatively from each pin to allow the pin to hang freely from its associated clamp.

7. A machine for handling pins including an annular magazine mounted with its axis vertical for receiving the pins with their axes vertical, a stationary upper stop constituting a false bottom to the magazine to support the lower ends of the pins in the magazine and having an end, means for imparting to the magazine a feeding movement of rotation about its axis, so as to disengage the pins successively from their upper stop by carrying them past its end so that they fall, a lower stop in the form of a disc mounted to rotate about a vertical axis different from that of the magazine and serving to limit the fall of each pin and support it in a fallen position with the majority of its length clear of the magazine, the ratios of the angular velocities of the magazine and lower stop being controlled so that their linear velocities are approximately equal at the region where a pin is supported by the lower stop, whereafter the path of the pin takes it clear of the lower stop, and clamps each situated adjacent and adapted to grip the upper part of a pin in its fallen position.

8. A machine for handling pins including an annular magazine mounted with its axis vertical for receiving the pins with their axes vertical, a stationary upper stop constituting a false bottom to the magazine to support the lower ends of the pins in the magazine and having an end, means for imparting to the magazine a feeding movement of rotation about its axis, so as to disengage the pins successively from their upper stop by carrying them past its end so that they fall, a lower stop in the form of a disc mounted to rotate about a vertical axis different from that of the magazine and serving to limit the fall of each pin and support it in a fallen position with the majority of its length clear of the magazine, the ratios of the angular velocities of the magazine and lower stop being controlled so that their linear velocities are approximately equal at the region where a pin is supported by the lower stop, whereafter the path of the pin takes it clear of the lower stop, and clamps moving with the magazine and each situated adjacent and adapted to grip the upper part of a pin, a stationary cam arranged to open each cam before its associated pin falls from the upper stop and to close it to grip the pin as the pin rests on the lower stop.

9. A machine for handling pins including an annular magazine mounted with its axis vertical for receiving the pins with their axes vertical, a stationary upper stop constituting a false bottom to the magazine to support the lower ends of the pins in the magazine and having an end, means for imparting to the magazine a feeding movement of rotation about its axis, so as to disengage the pins successively from their upper stop by carrying them past its end so that they fall, a lower stop in the form of a disc mounted to rotate about a vertical axis different from that of the magazine and serving to limit the fall of each pin and support it in a fallen position with the majority of its length clear of the magazine, the ratios of the angular velocities of the magazine and lower stop being controlled so that their linear velocities are approximately equal at the region where a pin is supported by the lower stop, whereafter the path of the pin takes it clear of the lower stop, and clamps moving with the magazine and each situated adjacent and adapted to grip the upper part of a pin, a stationary cam arranged to open each cam before its associated pin falls from the upper stop and to close it to grip the pin as the pin rests on the lower stop, and a cam arranged to open each clamp after it has gripped its pin for a predetermined period.

10. A machine as claimed in claim 9 in which the height of the lower stop is adjustable.

11. A machine as claimed in claim 9 in which induction heating means are provided for heating the pins as they hang from their clamps and comprising a coil shaped to form a pair of part-cylindrical walls coaxial with the magazine, the walls being adjacent to and on opposite sides of the path of the pins as they hang from the clamps and being joined at one end beyond the point of release of the pins from the clamps and at the other end beneath the path of the lower ends of the pins.

12. A machine for handling pins including an annular magazine mounted with its axes vertical for receiving the pins with their axes vertical, a stop constituting a false bottom to the magazine to support the lower ends of the pins in the magazine and having an end, means for imparting to the magazine a feeding movement of rotation about its axis so as to disengage the pins successively from their stop by carrying them past its end, said stop being in the form of a disk mounted to rotate about a vertical axis different from that of the magazine, the ratios of the angular velocities of the magazine and the stop being controlled so that the linear velocities are approximately equal at the region where a pin is supported by the stop, whereafter the path of the pin takes it clear of the stop and clamps each situated adjacent and adapted to grip the upper part of a pin to support the pin after it has cleared the stop.

LEONARD CHARLES COLLYER.

REFERENCES CITED

The following references are of record in the file of this patent:

UNITED STATES PATENTS

| Number | Name | Date |
|---|---|---|
| 502,594 | Standish | Aug. 1, 1893 |
| 1,350,697 | Bock | Aug. 24, 1920 |
| 2,213,774 | Taylor | Sept. 3, 1940 |
| 2,319,474 | Price | May 18, 1943 |
| 2,439,517 | Johnson | Apr. 13, 1948 |
| 2,476,935 | Wharff | July 19, 1949 |